United States Patent [19]

Basse

[11] Patent Number: 4,929,484

[45] Date of Patent: May 29, 1990

[54] FILLING MATERIAL FOR PERCOLATING FILTERS FOR THE TREATMENT OF LIQUIDS AND PROCESS FOR PRODUCING AND ASSEMBLING IT

[75] Inventor: Hartwig Basse, Nordenham, Fed. Rep. of Germany

[73] Assignee: Norddeutsche Seekabelwerke AG, Nordenham, Fed. Rep. of Germany

[21] Appl. No.: 128,845

[22] Filed: Dec. 4, 1987

[30] Foreign Application Priority Data

Dec. 9, 1986 [DE] Fed. Rep. of Germany ....... 3641960

[51] Int. Cl.[5] .......................... B01D 39/04; C02F 3/04
[52] U.S. Cl. ...................................... 428/53; 156/265;
   210/150; 210/151; 210/488; 210/605; 210/610;
   210/611; 210/615; 428/77; 428/115; 428/190
[58] Field of Search .................... 428/53, 77, 115, 190;
   156/265; 210/150, 151, 488, 605, 610, 611, 615

[56] References Cited

U.S. PATENT DOCUMENTS 4,294,694 10/1981 Coulthard .......................... 210/150

FOREIGN PATENT DOCUMENTS

1363416 8/1974 United Kingdom .

Primary Examiner—Marion C. McCamish
Attorney, Agent, or Firm—Sughrue, Mion, Zinn, Macpeak & Seas

[57] ABSTRACT

Filling material for percolating filters for the treatment of liquid and process for producing and assembling the material. Especially in biological sewage treatment, filling material must provide the best possible hold for the biological filter film necessary for the purpose and must have uniform wettability. The disadvantage of known apparatuses meeting these requirements is that they either tend to clog or are difficult to produce. The new filling material will work effectively and reliably, while being simple to produce and assemble. To provide ideal growth surfaces for the biological filter film, the filling material has a plurality of plastic strips (20) which are connected to one another by means of a single holding sheet (21). Furthermore, the strips (20) have a special shape, in particular corrugated edges and/or a structured neutral region. The filling material is especially suitable for biological treatment, particularly the denitrification of sewage or drinking water.

26 Claims, 7 Drawing Sheets

FILLING MATERIAL FOR PERCOLATING FILTERS FOR THE TREATMENT OF LIQUIDS AND PROCESS FOR PRODUCING AND ASSEMBLING IT

BACKGROUND OF THE INVENTION

The invention relates to a filling material for percolating filters for the treatment of liquids, especially for biological sewage purification. Furthermore, the invention relates to a process for producing filling material and to a process for assembling the filling material.

The filling bodies discussed here are used mainly for biological treatment in sewage disposal. They serve to receive the bacteria necessary for biological treatment, in particular a so-called filter film. At the same time, the efficiency of a percolating filter equipped with filling material depends on the specific growth area, the hold of the bacteria on this and the all-round unimpeded wetability of the filter film on the filling material by the liquid to be treated.

Filling materials of the relevant generic type, in which a plurality of plastic strips or plastic filaments are suspended, either individually or in bundles, on bars or beams of the supporting arrangement, are already known. A disadvantage of this is that the production of the known percolating filters made with this filling material involves a high outlay, specifically particularly when these have to be suspended individually on the supporting arrangement. Furthermore, when the filling material is suspended individually on the supporting arrangement there is no guarantee that it will be distributed uniformly in the percolating filter as a whole. Finally, the strips or filaments of this known filling material often do not hang securely enough on the bars or beams of the supporting arrangement.

SUMMARY OF THE INVENTION

Starting from this, the object on which the invention is based is to provide for a percolating filter a filling material which is effective, but nevertheless simple to produce and assemble, and a corresponding production and assembly process.

Because the plurality of strips are connected by means of a common holding sheet, it is possible to preassemble relatively large units on an industrial scale, this making it easier to assemble the percolating filters on the spot, because fewer units are required for a percolating filter made of the filling material according to the invention than for the comparable percolating filter with known filling materials.

An especially effective percolating filter is obtained if the filling material consists of several layers of strip-shaped sheets. In particular, a larger number of strips can therefore be assigned to a common holding sheet. Appropriately, the strips of adjacent layers are offset relative to one another an amount corresponding approximately to half the strip width, in such a way that the individual strips are "staggered" relative to one another. This ensures an especially uniform distribution of the strips of filling material and consequently the best possible wetting of these by the liquid to be treated.

An especially advantageous filling material is obtained if perforations are made in the holding sheet or the latter is produced in the form of a net. As a result, the holding sheet laid on top of the supporting beams of the supporting arrangement does not prevent the most efficient possible sprinkling of the filling material with the liquid to be treated.

In an advantageous exemplary embodiment of the filling material according to the invention, the holding sheet is laid transversely over the strips and welded to these. This provides the possibility of particularly simple production of the filling material, since, if the holding sheet is folded round the supporting beam in a U-shaped manner, the opposite ends of the continuous strips come to rest in two vertical percolating planes extending parallel to one another. The filling material thus acquires double the effective number of strips.

The strips for the filling material according to the invention can be of different types, depending on the intended use. In the simplest form, woven, but also multifilament threads or films can be used. In addition, the surfaces of the films can be roughened or structured, specifically the free edges in particular. The latter can be given a corrugated shape in an especially simple way by stretching, in order to provide sufficiently large wetting surface. Alternatively, it is also possible to provide strips of helical shape. In this respect, it has been shown, surprisingly, that these necessarily acquire a helical shape if a film is cut into strips of a width of less than 20 mm. This effect is particularly pronounced when the starting material used for the strips is a so-called raschel film consisting of calendered plastic woven fabric. If appropriate, the strips can also be produced from a braided or extruded netting or a tubular net. Thermoplastic, especially polypropylene, may be considered as a plastic for the abovementioned types of strip.

According to a further proposal of the invention, the holding sheets are welded to the strips by means of several, preferably two welding seams extending at a difference from and parallel to one another, specifically in such a way that non-welded edge strips are left at opposite edges of the holding sheet. When the filling material hangs over the supporting beams of the supporting arrangement, these edge strips project laterally at an acute angle from the vertical percolating planes, to form a trickling gutter which is conducive to the most efficient possible wetting of the strips laden with biological growth.

According to a further proposal of the invention, two groups of several superposed layers of adjacent strips are fastened to the opposite ends of the holding sheet, specifically preferably by means of welding. In this case, the filling material is only single-layer in the region of the holding sheet, and because of this it can be folded in a U-shaped manner especially simply for suspending on the supporting arrangement.

In the process for producing the filling material, because the strips are made by cutting up at least one film unwound from an endless bank, these can be prepared for further processing in the correct position, specifically continuously, at only a lower outlay in terms of labour. A further special feature of this process is that a larger quantity of the filling material according to the invention is wound successively on a supply reel. The suspension of the filling materials produced in this way on the supporting arrangement of the percolating filter can be simplified considerably thereby in comparison with known filling bodies of a comparable type.

In a further development of the process according to the invention, after the films have been cut into individual strips, but before the holding sheet is attached the strips are structured by being moved past appropriate deflecting drums, and if appropriate the edges of the strips are stretched. Alternatively, the latter operation can also be carried out by cutting the films in an appropriate way. These operations to manipulate the strip can be conducted continuously without any additional work cycles.

In a development of the process according to the invention, it is also proposed, at the same time as the holding sheet is attached, to delimit the finished filling material from the strips of subsequent filling material, specifically by marking or embossing. Consequently, on the one hand a larger quantity of filling material can be wound continuously on a single supply reel, whilst on the other hand it becomes possible to provide the preconditions for a simple severing, at the time of assembly, of filling materials joined to one another.

The process for assembling the filing material is distinguished especially in that the filling material is attached to the supporting arrangement in an amazingly simple way, because it is merely necessary to draw off from the supply reel a large number of strips which are prefabricated, in particular connected to one another by means of a common holding sheet, in order to hang individual supporting beams of the supporting arrangement with filling material by degrees in this way. It becomes simpler, here, to thread the two groups, each consisting of a multiplicity of strips, through the gaps between adjacent supporting beams because of a fork-shaped threading-in device, by means of which the strips of filling material resting flat on the supporting arrangement after being drawn off from the supply reel are pushed through the gaps on both sides of each supporting beam to be covered. Only just before the strips have been pushed through the gaps completely is the marking strip between the filling material to be attached and the subsequent filling material to be severed by means of an appropriate cutting means, for example shears or a knife. After the strips have been threaded in, the filling material laid over a supporting beam in this way is secured permanently and positively by means of an appropriate number of fastening means, for example nails, staples, screws or the like. This counteracts a possible slipping of the filling bodies on the supporting arrangement, simply, but effectively.

Two exemplary embodiments of the filling material according to the invention and an apparatus for producing and assembling it are explained in detail below with reference to the drawings. In these.

BRIEF DESCRIPTION OF THE DRAWINGS

DETAILED DESCRIPTION OF PREFERRED EMBODIMENTS

Figure 1:
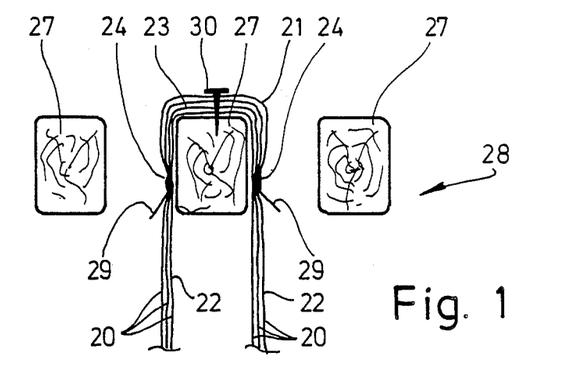
FIG. 1 shows a side view of the first embodiment of the filling material according to the invention, in the suspended state.
Figure 2:
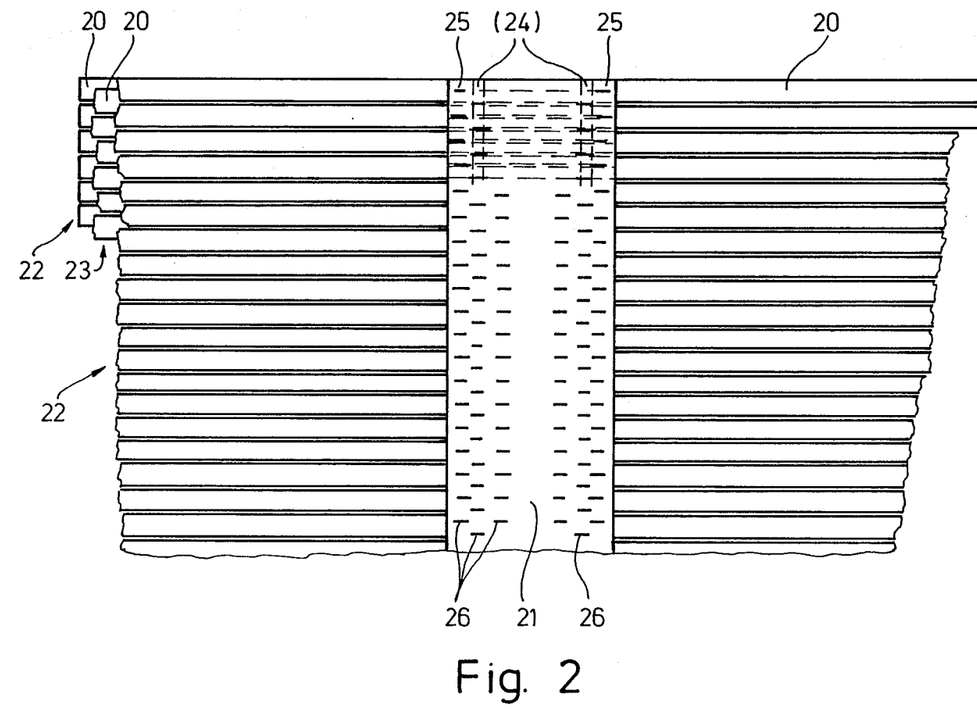
FIG. 2 shows a plan view of the filling material according to FIG. 1.

FIGS. 1 and 2 illustrate an embodiment of the filling material according to the invention, in which a plurality of elongate strips 20 are connected to one another by means of a central holding sheet 21 extending transversely. Here, the individual strips 20 of the filling material are arranged in three superposed layers 22 and 23. As shown in FIG. 2, the two outer layers 22 have the same number of strips 20. The arrangement of these strips 20 located in the outer layers 22 is also approximately the same. In contrast, the middle layer 23 has one strip 20 less. The strips 20 of the middle layer 23 can therefore be arranged offset relative to those of the two outer layers 22, in such a way that the strips 20 of the middle layer 23 lie centrally between two strips 20 of the outer layers 22, that is to say are "staggered". The length of the strips 20 is approximately the same in each layer 22 and 23.

FIG. 2 also shows that the strips 20 project relative to the holding sheet 21 to approximately the same extent on the left and on the right, each strip running continuously under the holding sheet 21 and a single strip 20 serving to form both parts of the filling material, in particular the filling material located on the left and on the right of the holding sheet 21.

In the present case, the strips 20 are connected to the holding sheet 21 by means of two parallel welding seams 24. The welding seams 24 extend at a distance from and parallel to the side edges of the holding sheet 21, thereby forming three edge portions 25 located opposite one another. Even between the welding seams 24, the strips 20 run without being connected to one another or to the holding sheet 21.

In the present exemplary embodiment, the holding sheet 21 has a plurality of continuous incisions 26 which are represented by elongate dashes in FIG. 2. Alternatively, instead of the incisions 26, holes or other perforations can also be provided in the holding sheet 21. It is also possible to design the holding sheet 21 as a net.

FIG. 1 shows several supporting beams 27 of a supporting arrangement 28, the filling material according to the invention being suspended on one of the supporting beams 27. As is evident from this Figure, the filling material is laid over the supporting beam 27 in a U-shaped manner, part of the holding sheet 21 covering the upper horizontal surface of the supporting beam 27, and lateral edge regions of the holding sheet 21 covering the major part of the vertical surfaces of the supporting beam 27 which are located opposite one another. The portions of the strips 20 which project relative to the holding sheet 21 on the left and right therefore hang down in parallel planes on both sides of the supporting beam 27.

FIG. 1 also reveals that, when the filling material is suspended, the free ends of the opposing edge portions 25 of the holding sheet 21 project at an acute angle from the plane of the strips 20. Thus, the opposing edge portions 25 of the holding sheet 21 form trickling ends 29 for the liquid to be treated, which is sprayed onto the filling material from the top of the supporting arrangement 28. The trickling ends 29 thereby contribute to the most efficient possible wetting of the strips 20 with the liquid to be treated.

Furthermore, the wetting of the strips 20 with the liquid to be treated is improved by the incisions 26 made in the holding sheet 21, because the liquid striking the horizontal portion of the holding sheet 21 does not need to flow off to the side completely via the trickling ends 29; on the contrary, some of the liquid can pass through the holding sheet 21 from the top of this and reach the strips 20.

It can also be seen from FIG. 1 that the welding seams 24 connect the three layers 22 and 23 of the strips 20 to one another and to the holding sheet 21.

Finally, FIG. 1 also shows a means of securing the filling material positively to the supporting beam 27. In the present case, this consists of one or more nails 30 which are driven from above, at a distance from one another, through the holding sheet 21 and the strips of the three layers 22 and 23 underneath, into the supporting beam 24.

Figure 3:
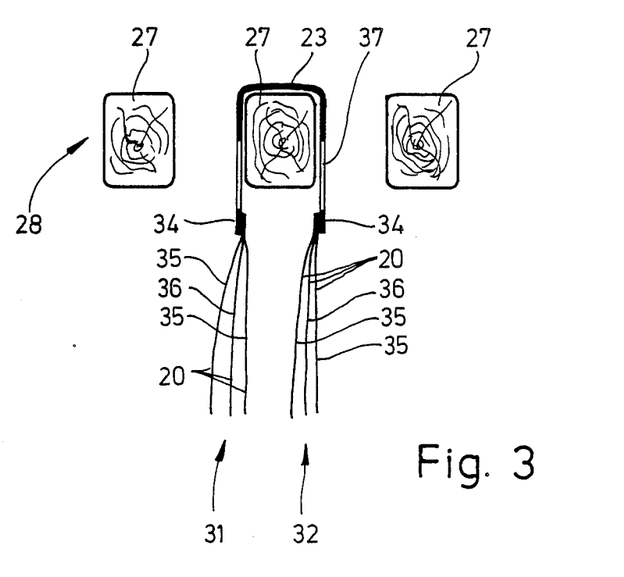
FIG. 3 shows a side view of a second embodiment of the filling material according to the invention, in the fitted state.
Figure 4:
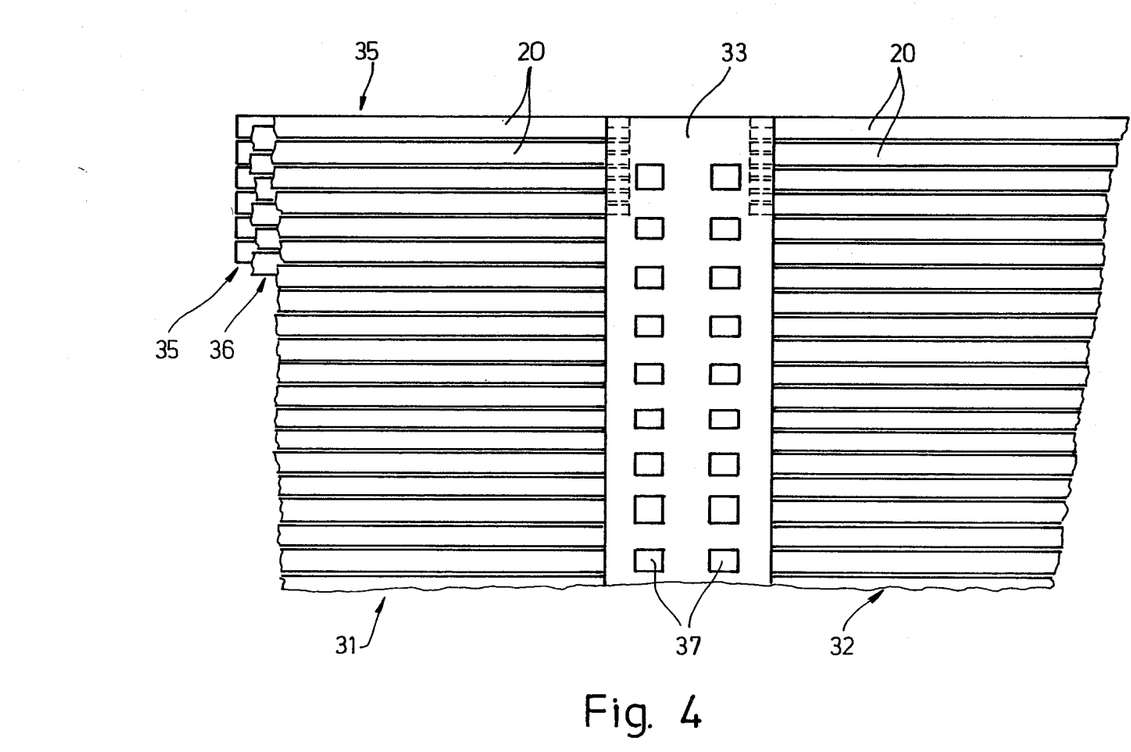
FIG. 4 shows a plan view of the filling material according to FIG. 3.

FIGS. 3 and 4 illustrate a second exemplary embodiment of the filling material according to the invention. Here, two separate groups 31 and 32 consisting of a plurality of strips 20 are connected to a holding sheet 33. Here too, each group, 31 or 32 consists of three layers 35 and 36, in particular two outer layers 35 and a middle layer 36. The relative arrangement of the strips 20 in the individual layers 35 and 36 can be similar to that of the first exemplary embodiment.

The two groups 31 and 32 of strips 20 are fastened to the holding sheet 33 in such a way that the upper ends of each group 31 and 32 are welded to the two longitudinal edges 34 of the holding sheet 33, specifically to the (inner) faces of the holding sheet 33 which are located opposite one another when the filling material is in the suspended state. It is also possible for one layer 35 to be welded firmly to the longitudinal edges 34 of the holding sheet 33 on the outside, whilst the remaining layers 35 and 36 are welded to the holding sheet 33 from inside, as shown in FIG. 3.

In the present exemplary embodiment, the holding sheet 33 has several rectangular perforations 37 distributed uniformly over its surface. As shown in FIG. 3, when the filling material is assembled the perforations 37 are located opposite one another, at approximately the same height, in the vertical portions of the holding sheet 33. In this exemplary embodiment of the filling material, the perforations 37 also ensure that the liquid conveyed from above can reach both sides of the strips 20 of the two groups 31 and 32, thus wetting these uniformly.

In the filling material of both exemplary embodiments, the holding sheets 21 and 33 are produced from an EV-resistant plastic film, preferably a polypropylene or polyethylene film. Alternatively, the holding sheet 21 or 33 can also be produced from a netting of the same material.

Figure 5:
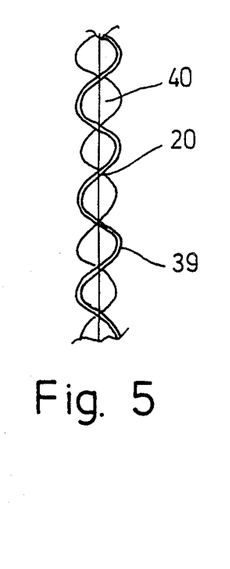
FIG. 5 is a side view of a strip portion shown enlarged.
Figure 6:
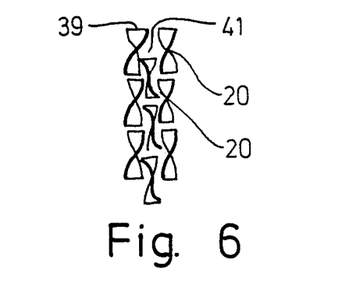
FIG. 6 shows an enlarged cross-section through several strips of a group.
Figure 7:
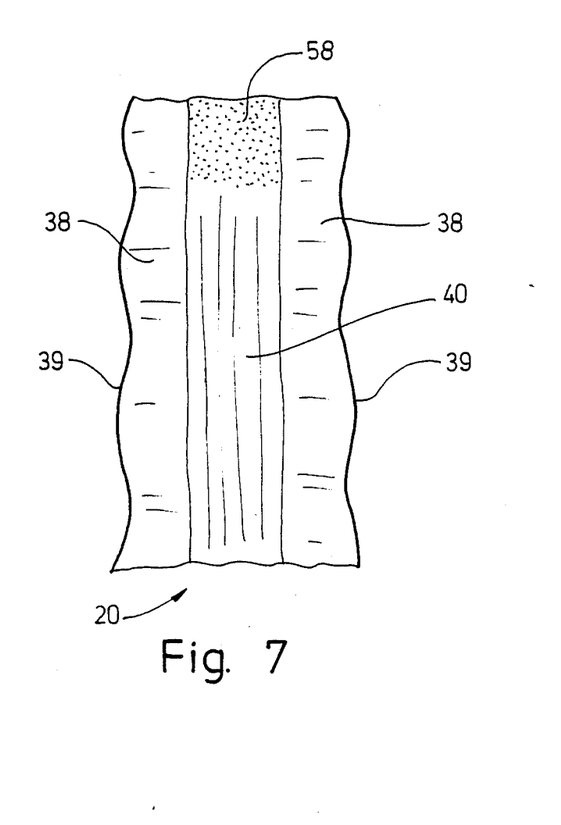
FIG. 7 shows an enlarged surface view of a portion of an individual strip.

Strips 20, such as those shown in FIGS. 5 to 7, can be used for the filling material of the two embodiments described above. These are strips 20 consisting of a film, preferably a "raschel film" of polypropylene or polyethylene. To increase the specific surface and provide ideal bonding properties of the biological filter film on the strips 20, in the exemplary embodiment illustrated these are treated in a special way. On the one hand, the opposing edge regions 38 of the strips 20 are subjected to plastic deformation by stretching or the like, specifically in such a way that the vertical edges 39 of the strips 20 have a sinuous shape. This can be sinusoidal, as shown in FIG. 5. However, the edges 39 can just as easily also have an irregular shape.

The arching decreases towards the centre of the strip 20, particularly in such a way that the strips 20 have a middle neutral region 40. Here, the strips 20 are smooth. This undeformed neutral region 40 of the strips 20 serves for absorbing the dead weight of the wetted strips 20, there being no notable elongation which could lead to the smoothing of the arched edges 39 under a tensile load. However, it is also possible to provide the surface of the neutral region 40 with a structuring 58 on the front and so-called rear face, as hinted at in FIG. 7.

It has been shown, surprisingly, that it is especially simple to produce the strips 20 illustrated, if these have a width of less than 20 mm. The strips then twist helically in the longitudinal direction, particularly after being suspended on the supporting arrangement 28. This additionally contributes to the best possible wetting of such strips 20 with the liquid to be treated.

FIG. 6 shows the ideal relative position of several strips 20 in relation to one another, when they are arranged according to FIGS. 2 and 4, that is to say are formed from three layers 22, 23 or 35, 36 of strips 20 lying next to one another, the middle layer 23 or 36 being offset relative to the outer layers 22 or 35. It becomes clear, at the same time, that uniform interspaces 41 are obtained between the strips 20 as a result of the sinuous edges 39 of these. This prevents strips 20 lying next to one another from sticking together over regions of their surface, and an accompanying reduction in the effectiveness of the filling material. Contact can occur only at certain points, if at all, because the edges 39 of the strips 20 can come in contact with adjacent strips 20 only approximately in a direction perpendicular to the surface.

As an alternative to the design of the strips 20 shown in FIGS. 5 to 7, these can also be produced from plastic strips or plastic tubes in the form of netting.

Figure 8:
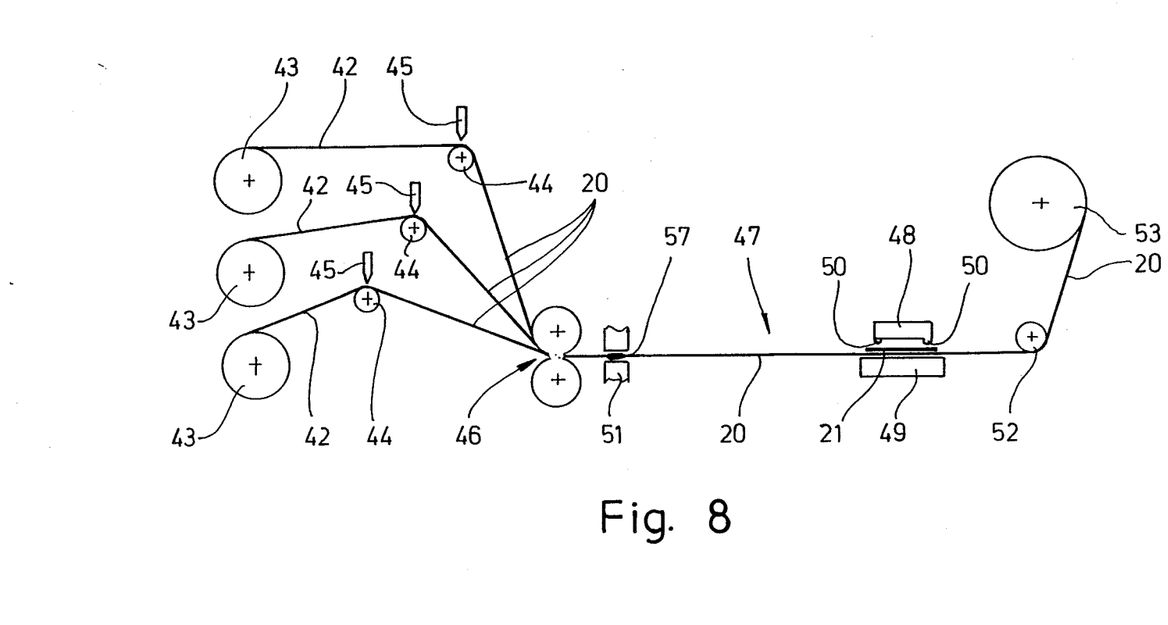
FIG. 8 shows a side view of an apparatus for producing the filling material according to the first exemplary embodiments of FIGS. 1 and 2.
Figure 9:
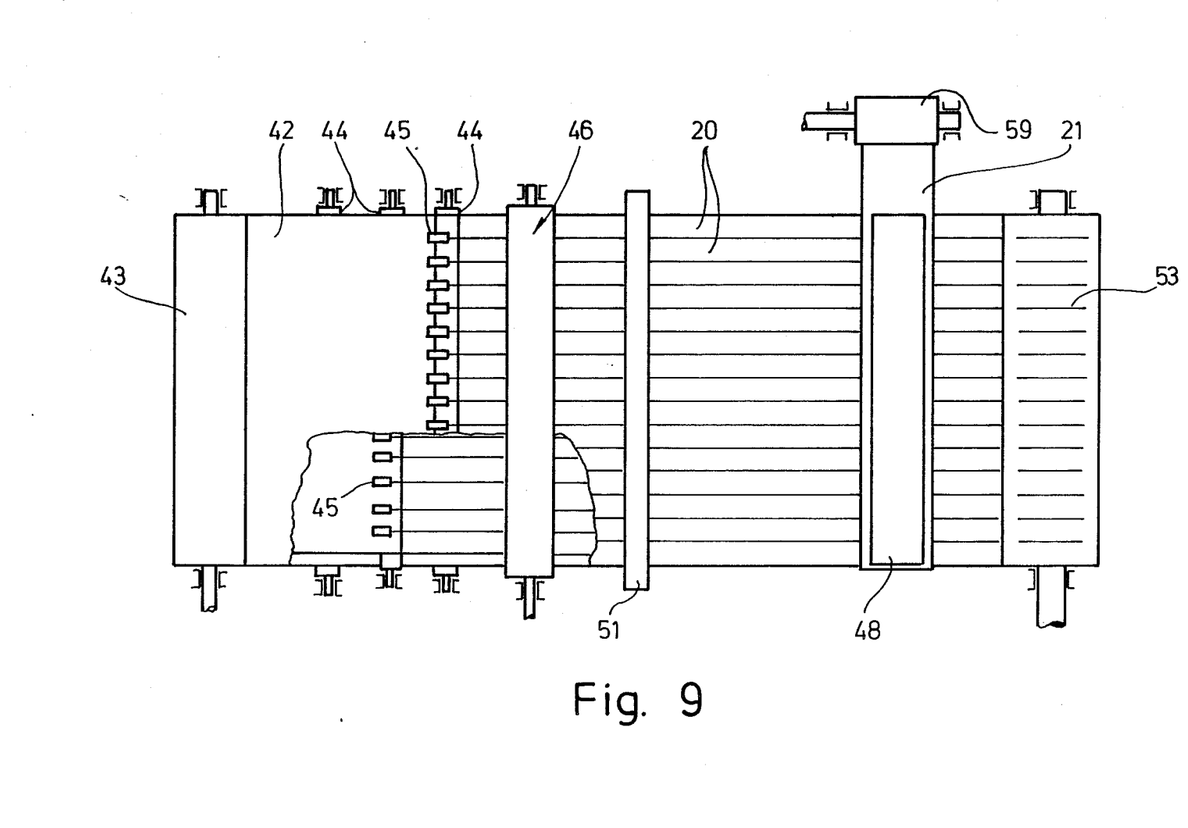
FIG. 9 shows a diagramatic plan view of the apparatus according to FIG. 8.

An apparatus for producing the first exemplary embodiment of the filling material according to the invention, shown in FIGS. 1 and 2, is illustrated diagramatically in FIGS. 8 and 9. According to these, each layer 22 and 23 of the strips 20 to be produced is formed from a corresponding web of material 42 which is drawn continuously off from a material reel 43. For this purpose, the apparatus has three material reels 43, from which three webs of material 42 are drawn off uniformly and conveyed to deflecting drums 44. The deflecting drums serve, here, as abutments for a plurality of knives 45 arranged next to one another at the same distance. These cut the webs of material 42 into strips 20 of approximately equal width. It can be seen from FIG. 9 that the knives 45 for forming the middle layer 23 are arranged offset relative to the knives 45 of the outer layers 22. By means of offset cuts, strips 20 automatically lying offset, in particular staggered, relative to one another are thus obtained. If the knives 45 are arranged and designed in an appropriate way, the edges 39 can be stretched at the same time as the cutting operation, so that there is no need for a further work cycle to achieve this.

After the webs of material 42 have been cut into appropriate strips 20, these are guided together through between a pair of rollers 46. The outer surface of at least one roller of this pair of rollers 46 can be provided with appropriate profiling for the structuring of the strips 20 brought together. However, it is also possible, before or after the deflecting drums 44, that is to say before or after the webs of material 42 have been cut into the strips 20, to guide each web of material 42 along a structuring roller (not shown) or a pair of structuring rollers or through the said pair.

After the strips 20 have been brought together at the pair of rollers 46, there follows a final treatment zone 47. Here, the strips 20 are connected to the transversely directed holding sheet 21. As can be seen in FIG. 9, this is likewise drawn off endlessly from a material reel 59 arranged transversely relative to the material reels 43. When the strips 20 of the holding sheet 21 stop momentarily, they are welded together by means of a pair of transversely directed welding jaws 48 and 49 which cause them to be welded to one another under the effect of heat and at the same time being pressed together momentarily. To make the two parallel welding seams 24, the (upper) welding jaw 48 has, on its underside, two parallel ribs 50 which form two parallel contact strips with the holding sheet 21 during welding.

At the same time as the strips 20 are welded to the holding sheet 21, a sealing device 51 arranged at a distance in front of the welding jaws 48 and 49 (as seen in the working direction of the apparatus) marks the transition from one filling material to the subsequent filling material by forming a marking strip 57.

The finished filling material, after being welded to the holding sheet 21, is conveyed via a deflecting roller 52 to a stock drum 53, on which the finished filling material is received successively and in continuous form. The filling material wound successively on the stock drum 53 in this way can then be suspended on the supporting beams 27 of the supporting arrangement 28 by degrees during the production of the percolating filter.

Figure 10:
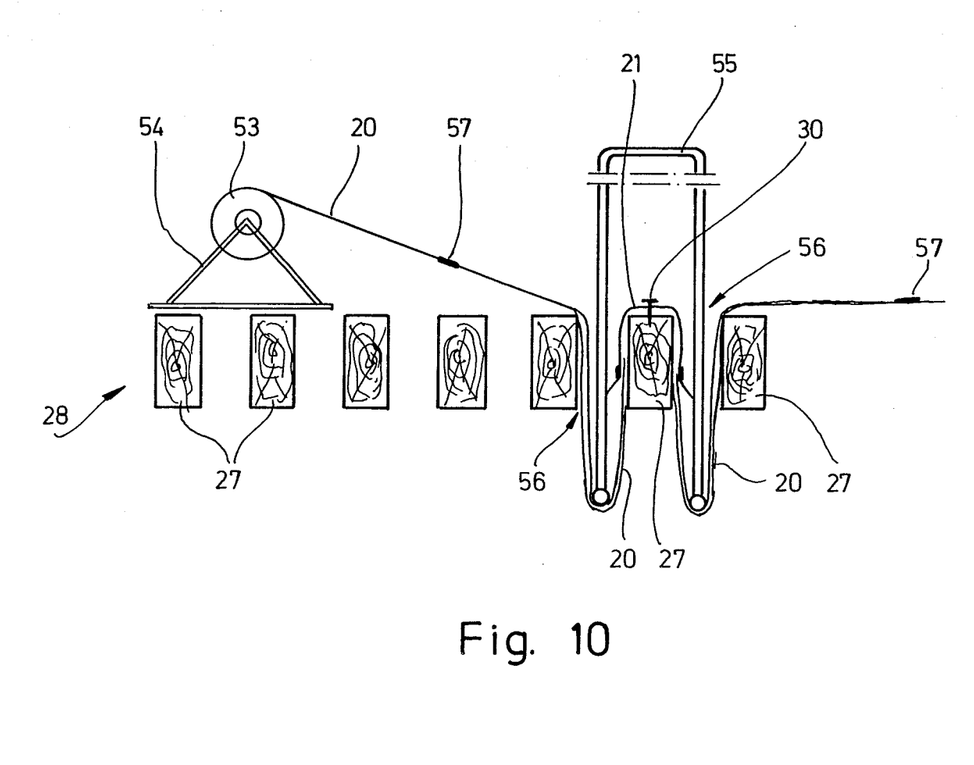
FIG. 10 shows a side view of an assembly device for the filling material of the two exemplary embodiments.

FIG. 10 shows diagramatically the assembly of the filling material according to the invention. For this purpose, an unwinding frame 54 with a stock drum 53 is placed on the supporting arrangement 28 consisting of supporting beams 27 arranged next to and at a distance from one another in a horizontal plane. The filling material is then drawn off from the stock drum 53 by degrees, specifically always until the holding sheet 21 or 33 comes to rest approximately centrally above the supporting beam 27 to be equipped with the filling material. By means of one or more nails 30, the holding sheet 21 or 33, together with strips 20 secured to it, is then fastened to the upper horizontal surface of the supporting beam 27. Subsequently, by means of a U-shaped assembly fork 55, the strips 20 are pushed, on both sides of the holding sheets 21 or 33, through the gaps located on both sides next to the respective supporting beam 27, until the free ends of the strips 20 hang down freely.

If appropriate, the free ends of the strips 20 directed towards the stock drum 53 must also be separated from the subsequent filling material beforehand, by severing the marking strip 57 produced by the sealing device 51 and indicating the subsequent filling material, specifically either by tearing or cutting.

The filling material according to the invention of both exemplary embodiments can be suspended on the other supporting beams 27 of the supporting arrangement 28 in the same way, in order to complete the percolating filter.

What is claimed is:

1. Filling material for percolating filters for the treatment of liquids, especially for biological sewage purification, and which is adapted to be suspended on a supporting arrangement, said material comprising a plurality of plastic strips (20) and a single holding sheet (21, 33) which connects said strips (20) to one another, said holding sheet (21, 33) being directed transversely relative to said strips longitudinal direction.

2. Filling material according to claim 1, wherein said holding sheet is a net.

3. Filling material according to claim 1, wherein said holding sheet is a film.

4. Filling material according to claim 3 characterised in that the holding sheet (21, 33) is provided with incisions (26).

5. Filling material according to claim 3, wherein said holding sheet is provided with perforations (37).

6. Filling material according to claim 4, 2 or 5 characterised in that the strips (20) are connected to the holding sheet (21, 33), by means of welding, so as to lie next to one another.

7. Filling material according to claim 6, characterised by at least three layers (22, 23; 35, 36) of strips (20) lying next to one another.

8. Filling material according to claim 7, characterised in that each layer (22, 23; 35, 36) consists of strips (20) lying next to one another directly or with a small interspace, and one of the layers (23; 36) is offset relative to adjacent layers (22, 35), in such a way that the strips (20) of adjacent layers (22, 23; 35, 36) are arranged "staggered".

9. Filling material according to claim 6, characterised in that the holding sheet (21) directed transversely, extends approximately centrally between opposing ends of said continuous strips (20).

10. Filling material according to claim 9, characterised in that the holding sheet (21) is connected to the strips (20) by means of two continuous and parallel welding seams (24).

11. Filling material according to claim 10, characterised in that the welding seams (24) are arranged at a distance from the edges of the holding sheet (21), to form opposite free trickling ends (29) on the holding sheet (21).

12. Filling material according to claims 4, 2 or 5 characterised in that the holding sheet (21, 33) is U-shaped in the state suspended on the supporting arrangement 28.

13. Filling material according to claim 4, 2 or 5 characterised in that two groups (31, 32) of separate strips (20) are connected to opposite longitudinal edges (34) of the holding sheet (33).

14. Filling material according to claim 13, characterised in that the strips (20) are arranged on the holding sheet (33) in such a way that they are located on the mutually confronting inner faces of the vertical legs of the holding sheet (33) which is U-shaped in the assembled state.

15. Filling material according to claim 4, 2 or 5, characterised in that the strips (20) consist of a polyethylene or polypropylene film.

16. Filling material according to claim 15, characterised in that the film of the strips (20) has a surface structured on one side or on both sides.

17. Filling material according to claim 15, characterised in that edges (39) of the strips (20) are stretched to form corrugated edge regions (38).

18. Process for producing for sewage treatment, a filling material according to claim 1, characterised in that a web of material (42) is drawn off from at least one material reel (43), and the web of material (42) is cut into strips (20), welded to a transversely directed holding sheet (21) and wound onto a stock drum (53).

19. Process according to claim 18, characterised in that the web of material (42) is continuously cut into strips (20) lying next to one another by means of a plurality of preferably stationary knives (45) during its movement past these in the drawing off direction (longitudinal direction).

20. Process according to claim 19, characterised in that, at the same time as the web of material (42) is cut, the cut faces forming the edges (39) of the strips (20) are stretched.

21. Process according to claim 18, characterised in that, after the cutting of the web of material (42), the strips (20) formed are guided over at least one deflecting drum with a profiled casing, for the structuring of the strips (20).

22. Process according to claim 21, characterised in that, after the cutting and possible structuring, the holding sheet (21) is drawn transversely over the strips (20) lying next to one another and is welded to them.

23. Process according to claim 22, characterised in that, during detachment of the holding sheet (21), the strips are marked over the entire width of the sheet, to form a marking strip (57) by which the subsequent filling material is delimited.

24. Process for attaching filling material for the treatment of liquids, according to claim 1, to a supporting arrangement consisting of a plurality of supporting beams arranged at a distance from one another, in a horizontal plane, characterised in that filling materials arranged successively on a stock drum (53) are unwound in succession, the leading filling material being laid over supporting beam (27) and being wrapped in a U-shaped manner round the supporting beam (27) by means of a threading-in device (assembly fork 55), with the ends of the strips (20) hanging down, and subsequently a marking strip (57) indicating the subsequent filling material being severed.

25. Process according to claim 24, characterised in that the filling material is suspended on the supporting beams (27) by means of a threading-in device designed as a U-shaped assembly fork (55), the vertical legs of the assembly fork (55) being at a distance from one another which causes them to pass approximately centrally through the gaps (56) located between adjacent supporting beams (27) on both sides of the supporting beam (27) to be covered.

26. Process according to claim 25, characterised in that the filling materials are fastened positively to the supporting beam (27), by means of at least one nail (30) or one or more staples.

* * * * *